(12) United States Patent
Erling et al.

(10) Patent No.: US 9,070,108 B2
(45) Date of Patent: Jun. 30, 2015

(54) DYNAMIC PERSONAL AIRPORT ADVISOR WITH INCORPORATED SERVICE CALL AND COLLABORATION FUNCTION

(75) Inventors: Echhard Erling, Mainz (DE); Matthias Graefe, Mainz (DE); Ivory W. Knipfer, Rochester, MN (US); Christopher R. Schneider, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/415,211

(22) Filed: Mar. 8, 2012

(65) Prior Publication Data

US 2012/0174015 A1    Jul. 5, 2012

Related U.S. Application Data

(63) Continuation of application No. 12/837,578, filed on Jul. 16, 2010.

(51) Int. Cl.
  G06Q 10/02    (2012.01)
  G06Q 10/10    (2012.01)

(52) U.S. Cl.
  CPC ..................... *G06Q 10/10* (2013.01)

(58) Field of Classification Search
  None
  See application file for complete search history.

(56) References Cited

U.S. PATENT DOCUMENTS

| | | | |
|---|---|---|---|
| 7,376,662 B2* | 5/2008 | Caparas et al. | 705/6 |
| 7,428,302 B2 | 9/2008 | Zirngibl et al. | |
| 7,502,746 B2 | 3/2009 | Bertram et al. | |
| 2002/0010604 A1* | 1/2002 | Block | 705/6 |
| 2002/0178018 A1* | 11/2002 | Gillis et al. | 705/1 |
| 2003/0046701 A1* | 3/2003 | O'Donnell | 725/76 |
| 2003/0225600 A1* | 12/2003 | Slivka et al. | 705/5 |
| 2004/0019606 A1* | 1/2004 | Ackerman et al. | 707/104.1 |
| 2004/0039614 A1* | 2/2004 | Maycotte et al. | 705/5 |
| 2005/0033614 A1* | 2/2005 | Lettovsky et al. | 705/5 |
| 2005/0096946 A1* | 5/2005 | Janakiraman et al. | 705/5 |
| 2005/0125265 A1* | 6/2005 | Bramnick et al. | 705/5 |
| 2005/0149254 A1* | 7/2005 | Yamada et al. | 701/202 |
| 2006/0059024 A1 | 3/2006 | Bailey et al. | |
| 2006/0241983 A1* | 10/2006 | Viale et al. | 705/5 |
| 2007/0203735 A1 | 8/2007 | Ashton | |
| 2008/0215383 A1 | 9/2008 | Sundt et al. | |
| 2009/0008439 A1 | 1/2009 | Kubler et al. | |
| 2009/0018770 A1* | 1/2009 | Burgess et al. | 701/209 |
| 2009/0030715 A1* | 1/2009 | Robb et al. | 705/1 |
| 2009/0138336 A1 | 5/2009 | Ashley, Jr. et al. | |
| 2009/0187640 A1 | 7/2009 | Delia et al. | |
| 2009/0287701 A1 | 11/2009 | Breaker et al. | |
| 2010/0056340 A1 | 3/2010 | Ellis et al. | |
| 2010/0273509 A1* | 10/2010 | Sweeney et al. | 455/456.3 |
| 2011/0267192 A1* | 11/2011 | Goldman et al. | 340/568.1 |

* cited by examiner

*Primary Examiner* — Matt Kim
*Assistant Examiner* — Mahelet Shiberou
(74) *Attorney, Agent, or Firm* — Lieberman & Brandsdorfer, LLC

(57) ABSTRACT

Optimizing travel and time management during travel. A travel tool is provided to receive travel objectives, which may also be prioritized and set with the tool. In response to detecting a disruption of an aspect of the set travel plans, this disruption is evaluated in an effort to mitigate the effects of the disruption. The impact of the disruption is evaluated and the travel plans are re-calculated. At least one modification to the set of travel plans is provided and selected in compliance with the set objective. This selection is communicated to the travel tool. Based upon the selection, the travel plans are dynamically modified while attaining the set objectives.

10 Claims, 8 Drawing Sheets

DYNAMIC PERSONAL AIRPORT ADVISOR WITH INCORPORATED SERVICE CALL AND COLLABORATION FUNCTION

CROSS REFERENCE TO RELATED APPLICATION(S)

The present application is a continuation of U.S. patent application Ser. No. 12/837,578, now pending, and is hereby incorporated by reference.

BACKGROUND

1. Technical Field

The present invention relates to a method for dynamic and interactive advisory services relating to specific travel objectives. More specifically, the invention relates to a system and method that enable automatic delivery of travel-related information in real-time to present a traveler with options to adjust original traveling plans under specific circumstances.

2. Description of the Prior Art

For most aviation travelers, airports constitute stressful areas where the traveler spends unproductive time. There are several known solutions that provide service and information to alleviate the above condition. These solutions include an on-line check-in, electronic flight plans, self check in terminals for departure, and information kiosks inside an airport. The main drawback for each of these solutions is that they are limited to a single aspect of a journey, such as airline information, shopping related information, or food related services. There is no interconnection between these applications to enable servicing information on multiple aspects of the journey. In addition, the existing solutions are not portable and can not be dynamically used in a real-time mode. Finally, the existing solutions do not provide situational analysis for travelers when a specific situation arises.

Accordingly, new personalized solutions are required to fulfill the needs of passengers. More specifically, there is a need for a portable application to service travelers with interconnected data related to multiple aspects of a journey, providing situational analysis, and presenting a traveler with multiple options to dynamically adjust travel plans under specific circumstances.

SUMMARY OF THE INVENTION

A method to enhance time management during travel while efficiently adjusting to changed circumstances.

The method is provided for optimizing time management during travel. Prioritized travel objectives are set with a travel tool in communication with an electronic communication device. A disruption to a first set of travel plans associated with the travel objectives is detected and evaluated. Travel plans are re-calculated as a response to the detected disruption. The re-calculation process includes analyzing at least one incident and evaluating impact of this evaluated incident with respect to the travel objectives. At least one option to the modified first set of travel plans that can accommodate the modification from the original objective is communicated from the travel tool to the traveler. Responsive to the analysis, the first set of travel plans is dynamically modified to attain the travel objectives.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
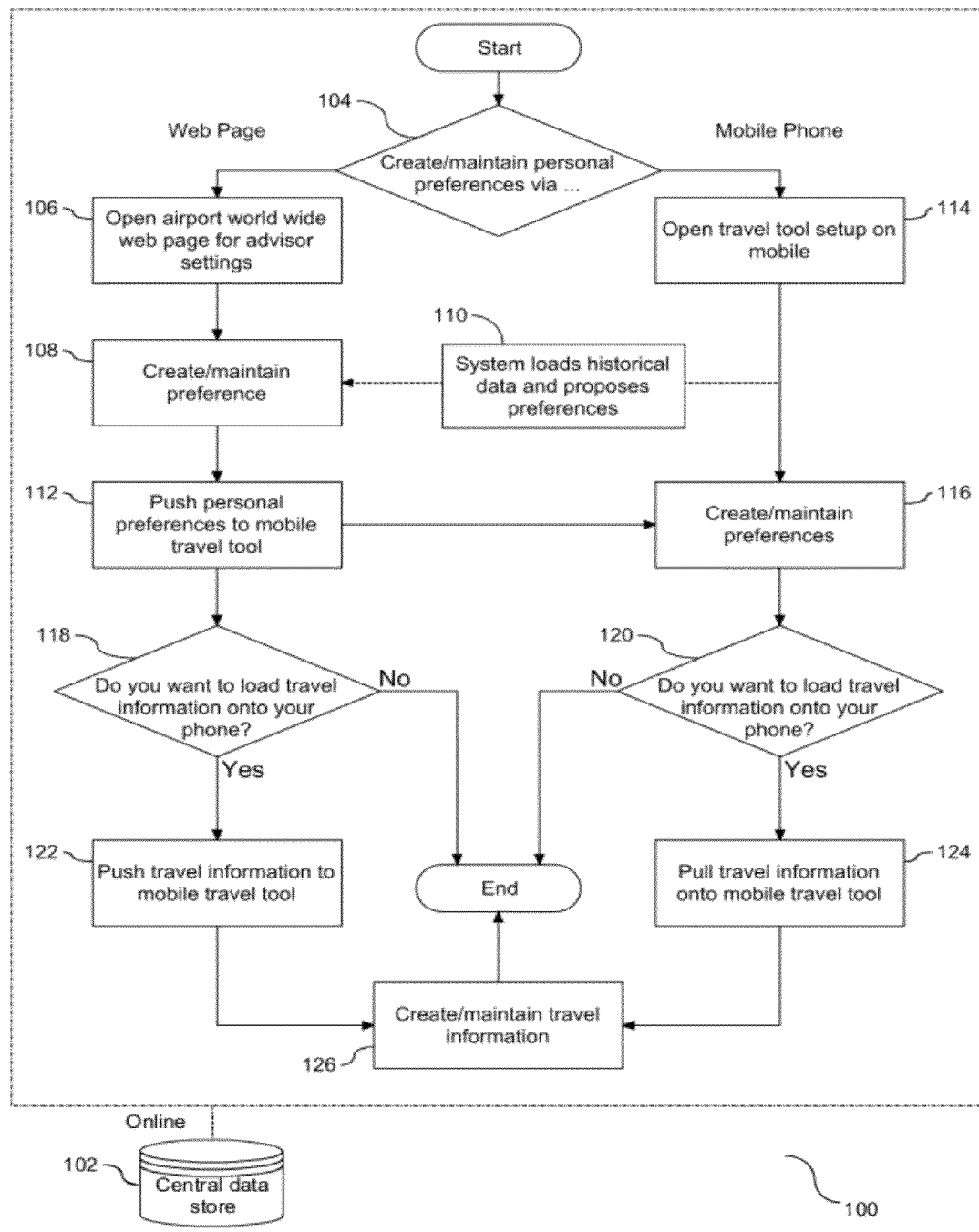
FIG. 1 is a flowchart illustrating a process for setting preferences of the travel tool.

It will be readily understood that the components of the present invention, as generally described and illustrated in the Figures herein, may be arranged and designed in a wide variety of different configurations. Thus, the following detailed description of the embodiments of the method of the present invention, as presented in the Figures, is not intended to limit the scope of the invention, as claimed, but is merely representative of selected embodiments of the invention.

The functional units described in this specification have been labeled as tools, modules, and/or managers. The functional units may be implemented in programmable hardware devices such as field programmable gate arrays, programmable array logic, programmable logic devices, or the like. The functional units may also be implemented in software for execution by various types of processors. An identified functional unit of executable code may, for instance, comprise one or more physical or logical blocks of computer instructions which may, for instance, be organized as an object, procedure, function, or other construct. Nevertheless, the executables of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of modules, managers, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Current travel tool technology employs tools to simplify and improve process steps associated with a travel plan. However, these are one-dimensional and are not directed to support multi-dimensional solutions associated with travel and travel itineraries. Examples of such tools include online check-in prior to arrival at the airport, self-check-in at the airport, information kiosks. However, none of these tools pertain to dynamic management of travel plans as one or more aspects of the plans are changed, and to interconnect different aspects of the travel plans affected by the change. A change to one aspect of the travel itinerary is likely to affect other aspects of the travel itinerary. For example, a late arriving flight can affect the ability to make a connecting flight, hotel reservations, meeting attendance, baggage claims, etc. Accordingly, a method is provided to dynamically address management of different aspects of travel plans and to automatically react to a change in a travel situation.

FIG. 1 is a flowchart (100) illustrating a process for initializing a mobile travel tool. As shown, data storage (102) is provided in communication with the tool. Data storage is employed to retain travel information, including, but not limited to ticket and flight detail, ground transportation, airport facility information, etc. As part of the initialization process, it is determined if the traveler wants to create and/or maintain preferences through a mobile device local to the application or through a host computing device remote from the mobile device (104). If it is determined at step (104) that the traveler has selected the host computing device, a browser is activated to open a page for travel tool settings (106). The traveler may then enter their preference settings, including creating settings, modifying existing settings, maintaining previously established settings, etc. (108). In addition, historical travel data and proposed preference settings are communicated to the traveler web page for consideration (110). Examples of preferences includes, but are not limited to, preferred airport activities, frequent traveler program, preferred restaurants, shopping interests and preferences, requested VIP services, special needs, etc. Once the preferences have been established at steps (108) and (110), the preferences are communicated to the travel tool application (112). Conversely, if at step (104) it is determined that the traveler has selected to create and/or maintain preferences directly with the mobile device local to the application, the application setup is opened on the mobile device (114) and preferences are creates and/or maintained (116). In addition to traveler information, there is also information pertaining to the airport and its physical characteristics that may be communicated to the application. Such information may include, but is not limited to, flight plan data, airport map, tourist information, airport attractions, airport sales information, etc. Following steps (112) or (116), it is determined if the traveler wants to load travel information to the travel application (118), (120). A positive response to the determination at step (118) is followed by a push of the travel information to the mobile device housing the travel application (122). Similarly, a positive response to the determination at step (120) is followed by a pull of the travel information to the mobile device housing the travel application (124). Following steps (122) and (124), the travel information is loaded into the application and the preference setting is completed (126). Similarly, a negative response to the determination at steps (118) or (120) completes the setting process.

Figure 2:
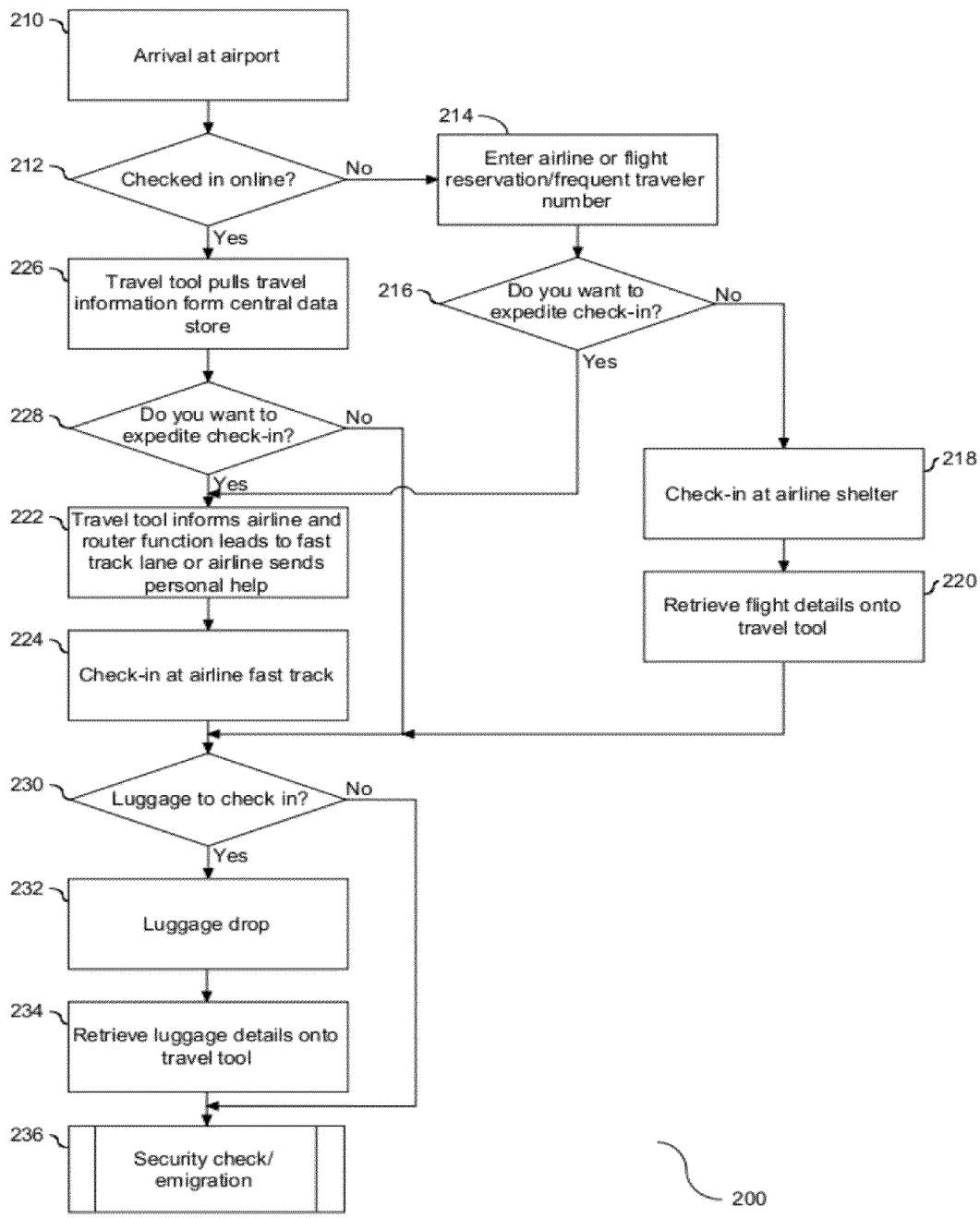
FIG. 2 is a flow chart illustrating a process for employing the travel tool for checking in for a departing flight.

The setting process illustrated in FIG. 1 configures the travel tool for one or more sets of travel plans. FIG. 2 is a flow chart (200) illustrating a process for utilizing the travel tool for checking-in for a departing flight. Upon arrival at the airport (210), it is determined if the traveler, who is the subject of the tool, has completed the check-in process online prior to arriving at the airport (212). If the traveler did not previously complete the check-in process, the flight information or reservation number is communicated to the travel tool (214). In one embodiment, the information communicated to the tool includes, but it not limited to flight number, reservation number, frequent flier number, etc. Similarly, in one embodiment, the traveler may only enter one of these parameters and the tool extracts the remaining travel information from data storage (102). Following the compilation of the travel data, an alert function ascertains if the traveler wants to expedite the check-in process for the designated flight (216). In one embodiment, the tool pulls preference information as established in FIG. 1 to determine if the traveler has a preset request for expedited check-in at the airport. Similarly, in one embodiment, the tool pulls airport data to determine if there are any queues associated with the remaining steps necessary to board the departing flight in a timely manner, and the time delays associated with any one of the queues. If there is a time delay that needs to be factored into the travel plans, the tool creates an alert to inform the traveler that there may be a delay, the nature of the delay, and may advise use of faster processing, if available. Accordingly, receipt of the alert may result in selection of the fast track at step (216).

A negative response to the determination at step (216) is followed by the travel completing the check-in process at an appropriately designated airline shelter (218) and retrieval of the flight details by the travel tool (220). Conversely, a positive response to the determination at step (216) enables the travel tool to activate the fast track check-in process. More specifically, the travel tool informs the airline of the expedited check-in request (222). The traveler will then be directed to a specified check-in lane for expedited requests, or the associated airline will send personnel to assist the traveler (224).

If at step (212) it is determined that the traveler has completed the check-in process on-line, the travel tool pulls travel information from data storage (226). More specifically, the travel information pertains to the preferences set and established in FIG. 1. In one embodiment, the travel tool determines the time necessary to arrive at the gate for the departing flight. If it is determined that there is or may be a time delay that needs to be factored into arriving at the departure gate, the tool generates an alert to inform the traveler that there may be a delay, the nature of the delay, and may advise use of faster processing, if available. Accordingly, receipt of the alert may result in selection expedited processing. In one embodiment, the traveler may be running late and may need to process through security in an accelerated manner in order to make the flight. Following step (226), it is determined if the traveler wants or needs expedited processing for completion of the check-in process (228). A positive response to the determination at step (228) is followed by a service call from the travel tool to the airline servicing the departing flight and a router function that the traveler needs to accelerate the remaining parts of the check-in process (222). Conversely, a negative response to the determination at step (228) or completion of steps (220) or (224) is followed by determining if the traveler needs to check-in any luggage for the flight (230). A positive response to the determination at step (230) is followed by completing the luggage drop (232), and uploading the luggage information to the travel tool (234). In one embodiment, the luggage information may include a luggage identifier, a baggage claim area, a radio frequency identifier, etc. Following a negative response to the determination at step (230) or completion of the luggage check-in at step (234), the traveler proceeds to security and emigration (236), as shown in FIG. 3. Accordingly, the tool functions to assist the traveler with the check-in process through generation of one or more alert and/or a service calls to facilitate an accelerated check-in.

Figure 3A:
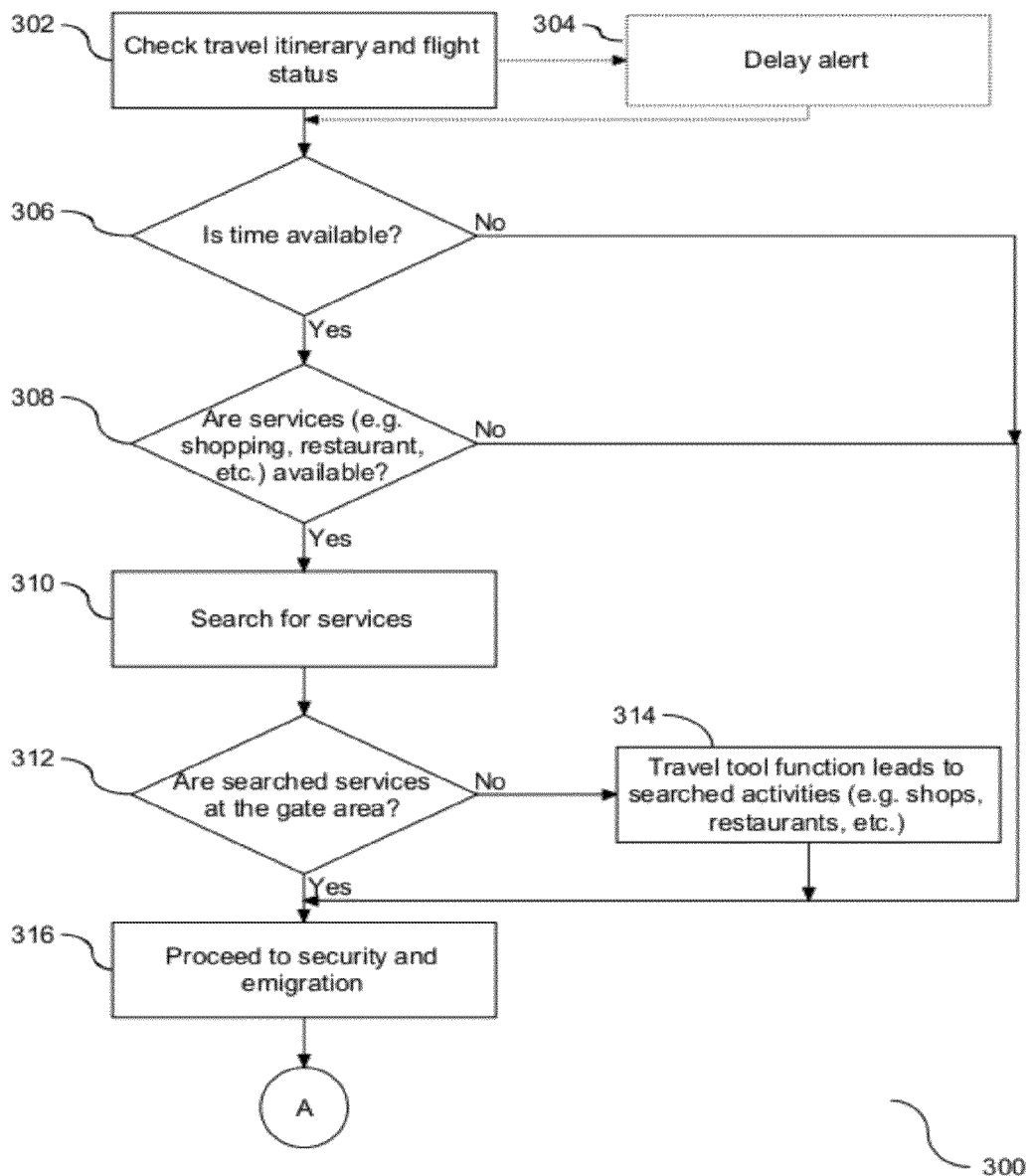
FIGS. 3A and 3B are a flow chart illustrating a process for processing through airport security and emigration.
Figure 3B:
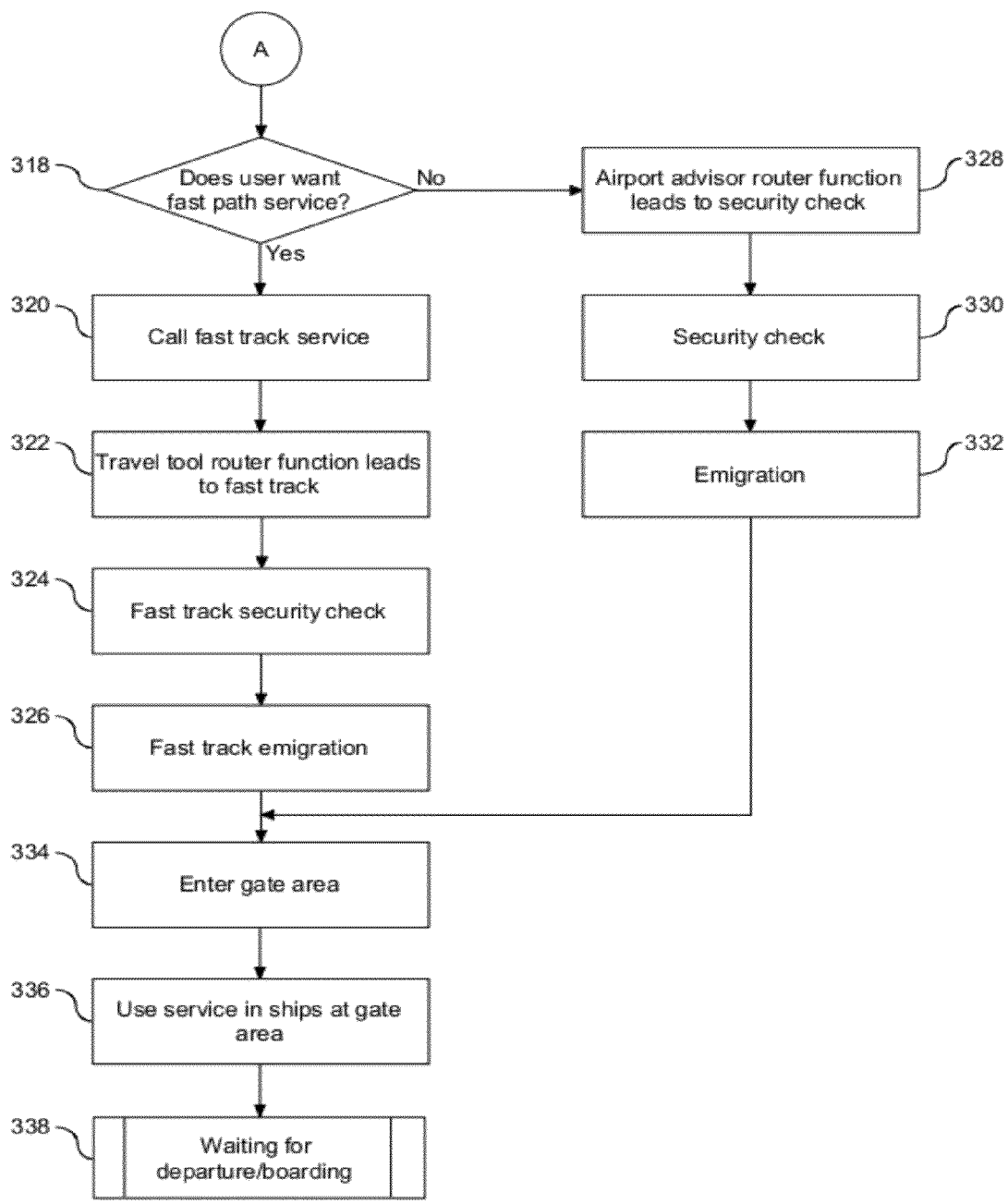

As noted in FIG. 2, part of the check-in process includes traveler and luggage check-in. Once the check-in is completed, the traveler must process through airport security and/ or emigration. FIGS. 3A and 3B are a flow chart (300) illustrating employment of the travel tool to facilitate security and emigration processing. Once the traveler has completed the check-in process, the tool presents the travel itinerary, including flight status and estimated time needed for the traveler to get to the departure gate (302). In one embodiment, the tool detects if there are any queues associated with the remaining steps necessary to board the departing flight in a timely manner, and the time delays associated with any one of the queues. If there is a time delay that needs to be factored into the travel plans, the tool creates an alert (304) to inform the traveler that there may be a delay, the nature of the delay, and may advise use of faster processing, if available. Following step (304), it is determined if the traveler has any excess time available to divert from proceeding directly to the departure gate (306). If there is excess time available, it is further determined if the traveler has any specific needs, such as shopping, eating, etc. (308). A positive response to the determination at step (308) is followed by the tool searching for shops, restaurants, products, etc. that are located at the airport (310). In one embodiment, the search results will provide a map of the airport facilities to enable the traveler to find the selected facility. Similarly, in one embodiment, the travel tool will provide the user with special offers available at one or more of the airport facilities. In addition, the travel tool provides the traveler with constant updates to flight departure time, any changes or delays thereof, waiting times for security, etc. It is important to note that these updates are provided in real-time, i.e. dynamic, as the tool is providing the traveler with critical travel management needs. Based upon the results of the search at step (310), it is further determined if any of the results from the search have found services proximal to the departure gate (312). The determination at step (312) enables the traveler to decide if they will go shopping before or after security and emigration processing. A negative response to the determination at step (312) is followed by the travel tool guiding the traveler to select the services prior to security and emigration processing (314). Conversely, a positive response to the determination at step (312), will require the traveler to proceed through security and emigration before shopping (316). Accordingly, the travel tool may be employed to direct the traveler to specific stores and/or vendors located within the airport.

Following completion of step (314) or a negative response to the determinations at either steps (306) or (308), the traveler proceeds to security and emigration (316). It is then determined if the traveler needs or wants to proceed through security in an expedited manner (318). There may be various reasons that necessitate the expedited security processing, including, but not limited to, limited time available to meet the flight departure time, the selected product or service being proximal to the departure gate, etc. Furthermore, in one embodiment, the selection of expedited security processing is limited to a select group of travelers, including first class ticket purchasers, travelers who pay for the services, etc. Accordingly, the tool facilitates airport processing by guiding the traveler to security processing in a time dependent manner.

If at step (318) the traveler elects to expedite processing through security; the travel tool facilitates the processing. More specifically, the travel tool generates a service call (320) to the office responsible for security processing. In one embodiment, there may be a fee associated with the service call. When the traveler arrives at the security processing location, the travel tool directs the traveler to the expedited process location (322) where the traveler may elect an expedited processing locale for both security (324) and/or emigration (326). Conversely, if it is determined at step (318) that the traveler does not require expedited security processing, the travel tool employs a router function to guide the traveler to the conventional locale (328), i.e. non-expedited, security and/or emigration processing (330) and (332), respectively. Following completion of processing of the traveler through security and/or emigration, either conventional or expedited, the traveler proceeds to the departure gate area (334). If one of the services searched at step (312) is proximal to the departure gate, the traveler may use the service once they have processed through security and emigration (336), time permitting, or proceed to the departure gate for boarding of the craft (338). In one embodiment, the use of airport services is retained in memory. Accordingly, the traveler tool facilitates time management with respect to security and/or emigration through a service call function that enables the traveler to expedite the time required for this portion of airport processing.

Figure 4:
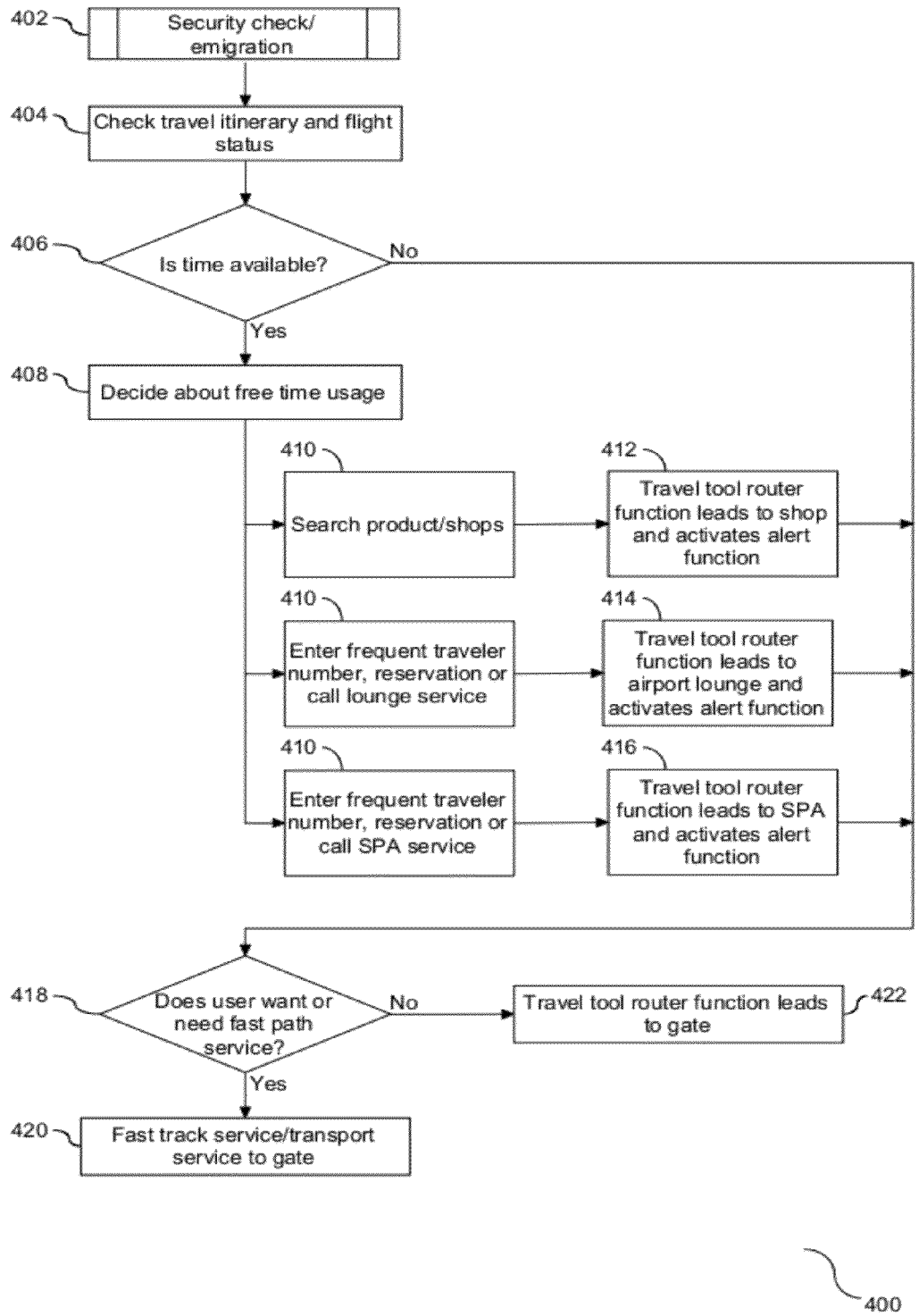
FIG. 4 is a flow chart illustrating a process for boarding a departing flight.

As demonstrated in FIGS. 1-3, the travel tool facilitates time management with respect to bringing the departing traveler to the departure gate and optimizing available and efficient use of available time for the traveler. FIG. 4 is a flow chart (400) illustrating use of the travel tool with respect to waiting for departure and boarding. As noted, the traveler has successfully passed through security and/or emigration processing (402). The travel tool then dynamically checks the travel itinerary and flight status (404). In one embodiment, the dynamic checking is processed in the background, and the traveler is shown the current flight status and the estimated time available to arrive at the gate. It is then determined if the traveler has time available prior to the scheduled boarding and departure times (406). A positive response to the determination at step (406) is followed by an alert function of the travel tool extracting information about available airport resources in the post-security and/or emigration section of the airport (408). The traveler may review the resources available, or it may query the tool for any recommendations of available airport resources (410). Following either step (408) or (410), the traveler decides whether they want to make use of any of the airport services, followed by the travel tool directing the traveler to a location for the selected service. In the example shown herein, the traveler may select one or more stores for shopping (412), resting at an airport lounge (414), and resting at a spa (416). Although only three services are shown herein, the invention should not be limited to these services or the quantity shown herein. In one embodiment, there may be additional or fewer services available depending upon the physical facilities of the airport. In one embodiment, regardless of the selection at steps (412), (414), or (416), the travel tool employs and activates an alert function with the selections at steps (412), (414), or (416) to communicate with the traveler when they need to leave the selected service and start making their way to the departure gate. Accordingly, the travel tool tracks selections and movement of the traveler in real-time in order to mitigate missing their flight.

If at step (406) or following steps (412), (414), or (416), it is determined that the traveler does not have time available to take part in the airport services or time remaining to employ the services, respectively, the travel tool enables the traveler to decide if they want or need to proceed to the departure gate in an expedited manner (418). A positive response by the traveler to the determination at step (418) is followed by the tool sending a service call to airport services to facilitate the expedited request (420). The services requested may be in various different forms, including but not limited to transport services. For example, in one embodiment, a special transport may be required to take the traveler from their current location to the departure gate in a timely manner. Depending upon circumstances, there may or may not be a fee for the requested service. A negative response by the traveler to the determination tool at step (418) is followed by the travel tool guiding the traveler to proceed to the departure gate without the use or request of any special services (422). In one embodiment, the travel tool includes a map of the airport and is employed to direct the traveler to the departure gate. Accordingly, the travel tool enables the traveler to elect use of airport services in order to meet the time restrictions associated with the flight departure.

Figure 5:
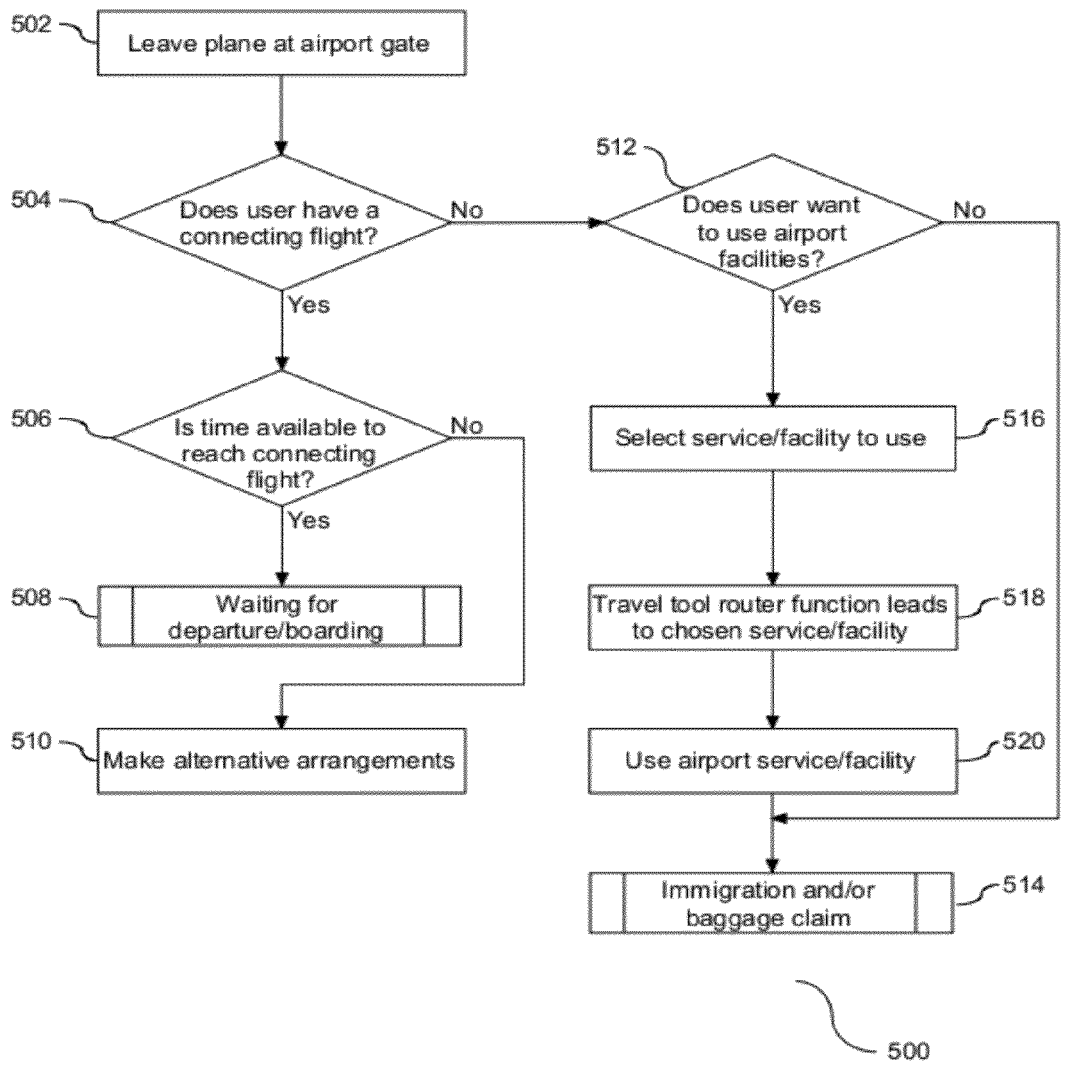
FIG. 5 is a flow chart illustrating a process for arrival at an airport and addressing a connecting flight.

It has become common in air transportation that more than one flight is required to get a traveler to their final destination. For example, the hub system has become commonplace, with travelers being transported to a hub, and from the hub that can take one or more connection flights to bring them to the final location. FIG. 5 is a flow chart (500) illustrating a process for utilizing the travel tool to manage a connection flight at an intervening airport location. As shown, the traveler arrives at the airport from a prior flight arrival (502). It is then determined if the traveler has a connecting flight from this airport as part of the travel itinerary (504). In one embodiment, the travel tool will upload and make viewable the travel itinerary together with connecting flight departure status and estimated time required to get to the departure gate of the connecting flight from the arrival gate of the prior flight. It is known that these gate assignments can change. The travel tool obtains the information on flight arrivals and departures in real-time, together with their gate location(s). A positive response to the determination at step (504) is followed by ascertaining if the traveler has time available to make it to the departure gate of their connecting flight (506). In one embodiment, the prior flight may have been subject to a delay, thereby causing a possible missed connection for the traveler. Similarly, in one embodiment, the travel tools pulls historical information and airport data to estimate a time interval for the traveler to reach the departing gate from the arriving gate of the prior flight, and makes the determination of whether the traveler should be able to reach the designated departure gate prior to completion of the boarding process. A negative response to the determination at step (506) is followed by the travel tool facilitating arrangements for an alternate flight, hotel accommodations, etc. (510). In one embodiment, the travel tool extracts flight data from one or more airlines servicing the terminal to find a connecting flight for the traveler. Similarly, in one embodiment, the traveler may employ the travel tool to obtain a seat reservation for the connecting flight based upon the extracted data. The travel tool may obtain the reservation without the need for a ticketing agent, or the travel tool may present the information to the traveler so that they may present it to a booking agent to secure a reservation. A positive response to the determination at step (506) is followed by the traveler waiting the required time to board the connecting flight (508). Accordingly, the travel tool may accommodate a travel itinerary with two or more flights required to meet the destination.

If at step (504) it is determined that the traveler has reached their destination; the travel tool may be used to take advantage of stores and/or services local to the airport (512). A determination that the traveler is ready to depart the airport is followed by the traveler proceeding to baggage claim and/or immigration, in the case of international travel (514). Conversely, a determination that the traveler wants to use one or more products and/or services of the airport, such as shopping, dining, etc, is followed by the traveler selecting one or more categories of products and/or services that they are interested in utilizing (516). The travel tool may be employed to select the products and/or services. For example, in one embodiment, the travel tool communicates with memory or data storage pertaining to the airport and presents airport specific information to the traveler. In one embodiment, the traveler may provide the travel tool with preferences of products and/or services, and the travel tool may communication with airport specific data to determine if any of the traveler preferences can be serviced at the airport, and if so, recommending the products and/or services to the traveler together with directions within the airport facilities. Once the products and/or services are selected, the travel tool provides route guidance instructions to direct the traveler to the selected location (518). After the traveler has completed the use of the airport facilities (520), or needs to depart for whatever reason, they can proceed to baggage claim and/or immigration processing, in the case of international travel (514). Accordingly, the travel tool dynamically interfaces with the user and airport facilities to provide the traveler with recommendations to meet their travel needs.

Figure 6:
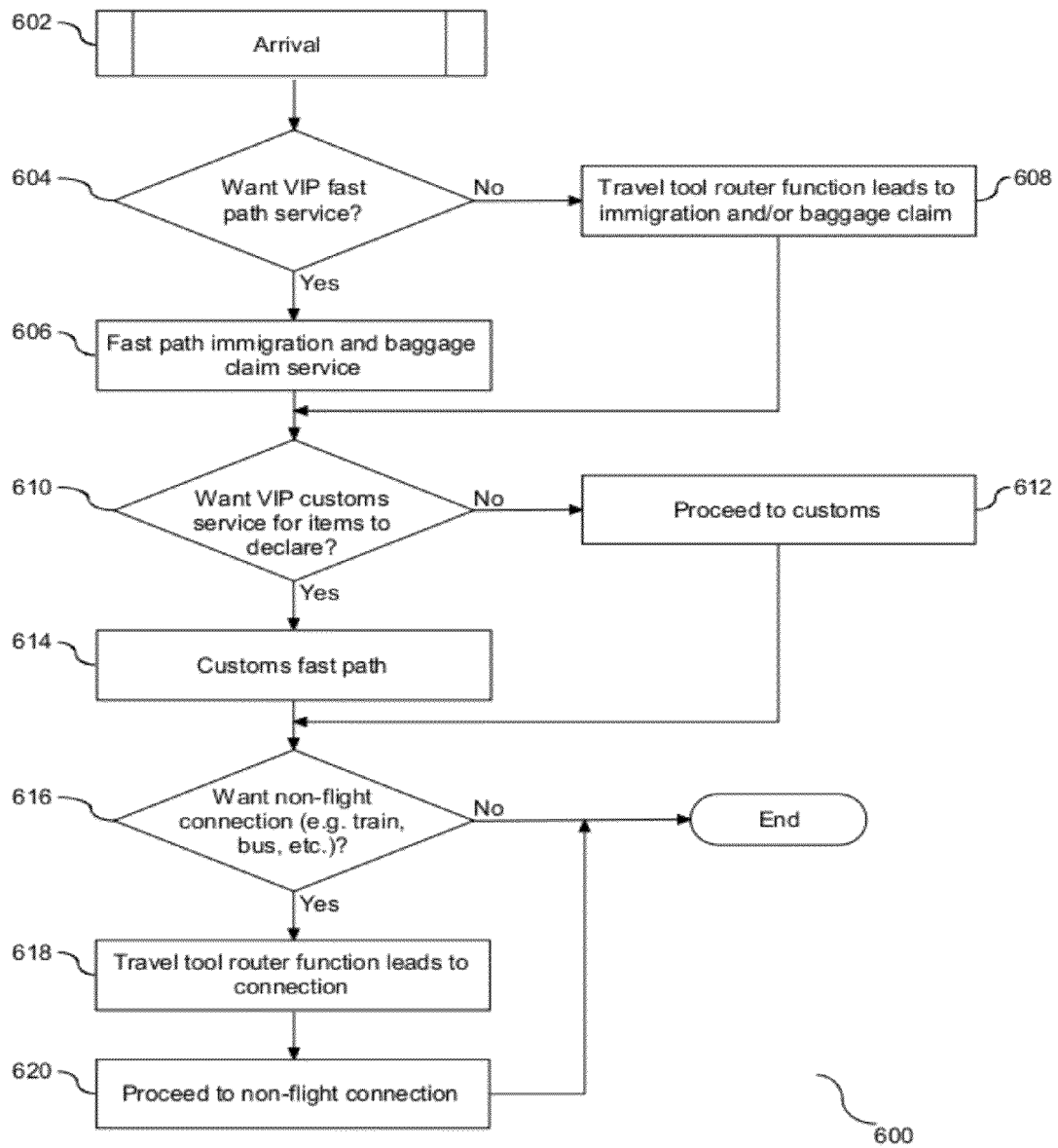
FIG. 6 is a flow chart illustrating a process for processing through immigration and claiming baggage.

As referenced in FIG. 5, the traveler may proceed to the baggage claim facility to claim their luggage prior to departure from the airport. Claiming checked baggage can be a stressful process, as airlines have a reputation for lost luggage. FIG. 6 is a flow chart (600) illustrating a process to facilitate baggage claim and to integrate the baggage claim process with the travel tool. Upon arriving at the airport location (602), the travel tool ascertains if the traveler will require special services to claim their luggage (604). In one embodiment, the travel tool will upload the travel itinerary and determine if there is a sufficient amount of time available for the traveler to proceed to the baggage claim area. For example, in one embodiment, the traveler may have arrived in the destination airport, but may need to switch to ground transportation to complete their travel. If the ground transportation is on a set schedule, such as a train schedule, the travel tool will pull this data, estimate time remaining to meet the train for departure, and inform the traveler if there is not enough time remaining to proceed to the baggage claim area and still meet the time requirements for the next leg of their travel. In one embodiment, the travel tool generates an alert message to inform the traveler of scheduling issues. If the traveler will require special services to process their checked baggage, a service call is communicated from the travel tool to airport services, and instructions are provided to accelerate baggage claim and/or immigration processing (606). In one embodiment, a fast path through baggage claim includes a third party getting the luggage from the baggage claim on behalf of the traveler. Immigration processing is something that is required on an individual basis. However, if the traveler has requested expedited processing, they can receive expedited processing through immigration. Accordingly, the travel tool can facilitate election of expedited processing to get the traveler through the airport and with airport services in a timely manner.

Conversely, if the traveler does not require any special service, the travel tool communicates instructions to the traveler to proceed to the designated conventional baggage claim area and/or immigration (608). With respect to baggage claim, in one embodiment, the travel tool may be employed to extract baggage claim location information from airport services, and to communicate this location to the traveler. In an embodiment with an airport supporting RFID technology, one or more luggage items may be assigned a radio frequency tag together with the travel tool having a radio frequency tag identifier to dynamically track the arrival time of the luggage item at an assigned baggage claim location. The travel tool may then be used to notify the traveler of the arrival time and/or baggage claim location for their luggage. Accordingly, the travel tool may be employed to facilitate baggage claim for the traveler.

In the case of international travel, the traveler is required to proceed through customs as part of their travel entry. Generally, when undertaking international travel, customs processing is required prior to exiting the airport. It is determined if the traveler requires expedited processing through customs (610). In one embodiment, the determination at step (610) is in the form of the traveler communication with the travel tool to request expedited processing through customs. Similarly, in one embodiment, the traveler will be assessed a fee for the expedited processing. If the determination at step (610) indicates that the traveler has not requested expedited process, has not agreed to pay the fee associated therewith, or if expedited customs processing is not available at this location, the traveler proceeds through conventional customs processing (612). Conversely, if the traveler has requested and been approved for expedited process, the traveler proceeds through the expedited customs processing location (614). Once the customs processing and baggage claim has completed, the traveler proceeds to exit the airport. It is determined if the traveler will be proceeding to ground transportation that is on a set schedule, such as a train, bus, etc. (616). A positive response to the determination at step (616) includes sending a communication to the traveler through the travel tool regarding the scheduled departure time and any other time critical information (618), including but not limited to estimated time to catch the scheduled transportation, directions, etc. The travel tool is then employed to communicate directions to the traveler to lead them to the connecting transportation (620). Accordingly, the travel tool facilitates the traveler's completion of the air travel through to obtaining ground transportation to bring the traveler to their destination.

Figure 7:
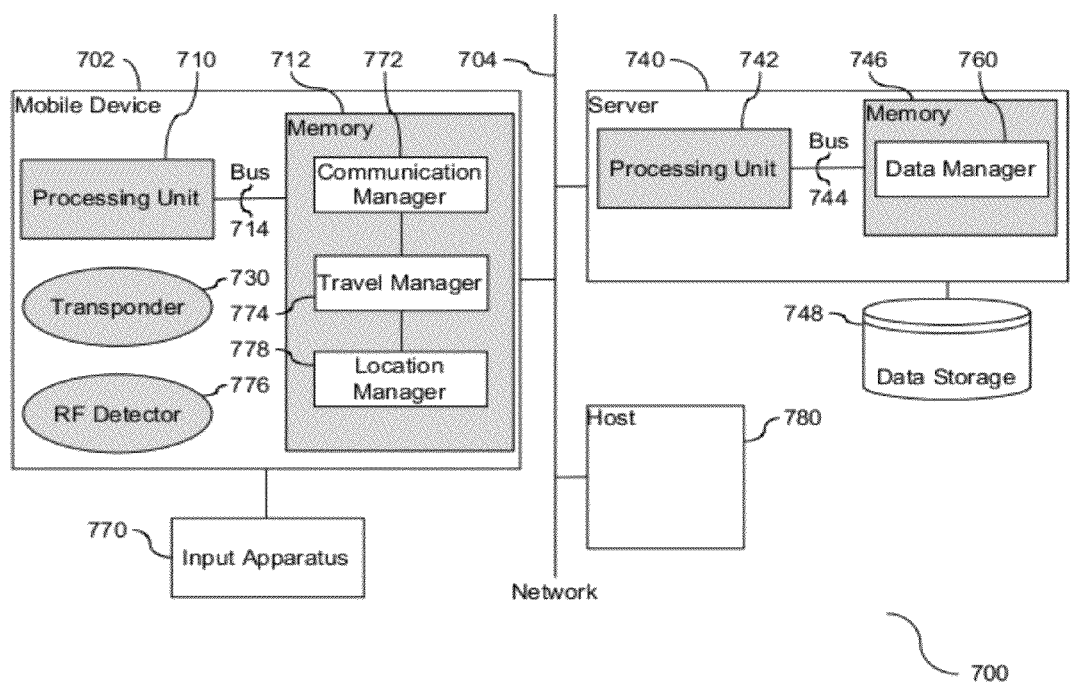
FIG. 7 is a block diagram illustrating system components of the travel tool application associated with the present invention, and is suggested for printing on the first page of the issued patent.

As demonstrated in the flow charts, a tool is employed together with work flow to facilitate air travel and associated services. Although the travel tool is discussed as a single item, it is a tool that may be comprised of a plurality of items to support its functionality. FIG. 7 is a block diagram (700) illustrating a travel communication system associated with the present invention. A mobile device (702) is provided in communication with a server (740) across a network (704). The device (702) is provided with a processing unit (710) in communication with memory (712) across a bus (714). A transponder (730) is embedded within the device (702). In one embodiment, the transponder (730) is in the form of a transceiver that transmits a signal upon reception of a designated incoming signal. Similarly, in one embodiment, the transponder (730) is configured for global position data. The server (740) is provided with a processing unit (742) in communication with memory (746) across a bus (744). The server (740) is in communication with the device (702) over the network (704). In addition, the server is in communication with data storage (748). In one embodiment, the data storage (748) includes, but is not limited to airport information, including flight schedules, airport map(s), luggage localization, etc., dynamic web information, including tourism and weather data, dynamic traveler community information, and account information. Although both the device (702) and the server (740) are shown with a single processing unit, the invention should not be limited to this configuration. In one embodiment, the device (702) and/or the server (740) may be configured with multiple processing units. Similarly, in one embodiment, there may be a plurality of servers (740) in communication with the device (702), or a plurality of devices (702) in communication with one or more servers (740). Accordingly, both the device (702) and the server (740) communicate over a shared network (704).

The server (740) is employed to support communication with the device (702). In one embodiment, a data manager (760) local to the server (740) gathers historical data pertaining to travel behavior and analyzes this data to provide current recommendations to the traveler. Data may be communicated to the device (702) directly through an input apparatus (770) or through a host machine (780) in communication with the device (702) across the network (704). Such data includes, but is not limited to travel itinerary, personal information, airport designation, etc. In one embodiment, the input apparatus (770) is in the form of a user interface that enables the traveler to set prioritized travel objectives. Similarly, in one embodiment, the device (702) employs a communication manager (772) to interface with the server (740) and one or more host machines (780) to extract airport information from data storage (748) associated with the travel itinerary. In addition, the device (702) includes a travel manager (774) in communication with the communication manager (772). The travel manager (774) is employed to dynamically manage the traveler in real-time, i.e. dynamically. More specifically, the travel manager (774) detects and analyzes any changes or disruption to the travel plans as outlined in the objectives of the travel itinerary. In the event of a detected change to one or more objectives, the travel manager (774) dynamically modifies the plans with a goal of reaching the original travel objectives. In one embodiment, the input apparatus (770) may be employed local to the device (702) to select the modified plans as conveyed by the travel manager (774). Similarly, in one embodiment, the input apparatus (770) is employed to confirm acceptance of the modified travel plan(s). Based upon the dynamic characteristics of the device (702) and it's associated managers, in one embodiment, the travel manager (774) is employed to analyze situational information associated with a travel disruption and to create a modified travel plan in accordance with one or more prioritized objectives as conveyed to the communication manager (772). Accordingly, the managers (772) and (774) are employed to mitigate issues associated with changes in travel itineraries.

It is known that travelers have luggage, some of which can be carried onto the aircraft, and some of which must be checked-in for retrieval after the flight has completed. In one embodiment, individual luggage items may be assigned a radio frequency identifier, and the device (702) may be provided a corresponding tool in the form of a radio frequency detector (776) to dynamically track the movement of the baggage and to communicate the movement and arrival time to the device (702). Accordingly, the detector (776) may be employed to facilitate expedited retrieval of luggage.

In one embodiment, the traveler may have time available at the airport to partake in one or more airport services. At the same time, it is imperative that the traveler maintain the itinerary schedule. As such, the device (702) may be provided with a location manager (778) in communication with the travel manager (774). The location manager (778) detects the current location of the device (702), and based upon the location provides information on one or more port services within a defined proximity. In one embodiment, the location manager detects the current location through the transponder (730). In addition to port services, the location manager (778) may be employed to detect any queues relevant to the traveler and/or to calculate any delays associated with detected queues. Such queues include, but are not limited to, airport services such as dining, spa, shopping, security, immigration, customs, etc. Accordingly, the location manager (778) may direct the travel to a specific service and also provide insight into the time to process through the specific service.

As shown herein, the data manager (760) resides in memory (746) local to the server (740), and each of the communication manager (772), travel manager (774), and location manager (778) reside in memory (712) local to the device (702). In one embodiment, the data manager (760), the communication manager (772), the travel manager (774), and the location manager (778) may each reside as hardware tools external to memory (746) and (712), respectively, or they may be implemented as a combination of hardware and software. Similarly, in one embodiment, the communication manager (772), the travel manager (774), and the location manager (778) may be combined into a single functional item that incorporate the functionality of the separate items. Furthermore, as shown herein, each of the communication manager (772), the travel manager (774), and the location manager (778) are local to one system (700). However, in one embodiment, they may be collectively or individually distributed across a network and function as a unit to embody the functionality of individual units. Accordingly, the data manager (760), the communication manager (772), the travel manager (774), and the location manager (778) may be implemented as software tools, hardware tools, or a combination of software and hardware tools for managing the functionality of the travel tool in a distributed manner.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device). Examples of a computer-readable medium include, but are not limited to, a semiconductor or solid state memory, magnetic tape, a removable computer diskette, random access memory (RAM), read-only memory (ROM), a rigid magnetic disk, and an optical disk. Current examples of optical disks include, but are not limited to, compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-usable or computer-readable medium providing program code for use by or in connection with a computer or any instruction execution system.

The tools provide for management of travel, travel related services, and more specifically for dynamically managing aspects of travel. One or more managers or tools are implemented to ensure that a travel plan may be dynamically modified in real-time to support travel objectives. In one embodiment, the manager(s) and/or tool(s) function in a dynamic manner that automates the modification of travel plans and mitigates inefficiencies and delays associated with travel.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for optimizing time management during travel, comprising:

setting prioritized travel objectives with a travel tool;

initializing the travel tool including identifying user-specific travel preference settings, wherein the travel preference settings include a travel amenity within an airport to facilitate travel in the port;

detecting a current location of the tool and communicating availability of at least one port service within a defined proximity of the travel tool;

detecting any queues associated with the at least one service and calculating any time delays for obtaining the at least one service;

detecting disruption to a first set of travel plans associated with the travel objectives, and evaluating the detected disruption;

re-calculating the travel plans, including analyzing at least one incident and evaluating impact with respect to the travel objectives in view of the identified preference settings;

re-evaluating the travel preference settings after detection of the disruption and searching for a facility to satisfy the amenity;

selecting at least one option to a modified first set of travel plans, the selection including satisfaction of the amenity, and communicating the selection to the travel tool; and dynamically modifying the first set of travel plans with the selected option to attain the set objectives in view of the identified preference settings.

2. The method of claim 1, further comprising modifying at least one set travel plan and receiving interactive confirmation of the modified travel plan.

3. The method of claim 1, wherein the step of detecting a disruption further comprises analyzing situational information pertaining to the disruption and creating a modified travel plan according to the prioritized objectives.

4. The method of claim 1, further comprising dynamically tracking arrival time of the luggage at an assigned baggage claim location, and communicating the arrival time and the baggage claim location to the travel tool.

5. The method of claim 1, wherein the amenity is selected from the group consisting of: airport activities, frequent traveler program, restaurants, shopping interests, VIP services, and special needs.

6. A computer program product for optimization of time management during travel, the computer program product comprising a non-transitory computer readable device having program code embodied therewith, the program code executable by a processing unit to:

set prioritized travel objectives with a travel tool;

initialize the travel tool including identifying user-specific travel preference settings, wherein the travel preference settings include a travel amenity within an airport to facilitate travel in the port;

detect a current location of the tool and communicating availability of at least one port service within a defined proximity of the travel tool;

detect any queues associated with the at least one service and calculating any time delays for obtaining the at least one service;

detect disruption to a first set of travel plans associated with the travel objectives, and evaluating the detected disruption;

re-calculate the travel plans, including analyzing at least one incident and evaluating impact with respect to the travel objectives in view of the identified preference settings;

re-evaluate the travel preference settings after detection of the disruption and searching for a facility to satisfy the amenity;

select at least one option to a modified first set of travel plans, the selection including satisfaction of the amenity, and communicating the selection to the travel tool; and dynamically modify the first set of travel plans with the selected option to attain the set objectives in view of the identified preference settings.

7. The computer program product of claim 6, further comprising program code to modify at least one set travel plan and receive interactive confirmation of the modified travel plan.

8. The computer program product of claim 6, wherein the detection of a disruption further comprises program code to analyze situational information pertaining to the disruption and creating a modified travel plan according to the prioritized objectives.

9. The computer program product of claim 6, further comprising program code to dynamically track arrival time of the luggage at an assigned baggage claim location, and communicate the arrival time and the baggage claim location to the travel tool.

10. The computer program product of claim 6, wherein the amenity is selected from the group consisting of: airport activities, frequent traveler program, restaurants, shopping interests, VIP services, and special needs.

\* \* \* \* \*